C. G. NEIGLICK.
HOSE BAND.
APPLICATION FILED MAR. 18, 1918. RENEWED MAR. 20, 1919.
1,305,737.
Patented June 3, 1919.
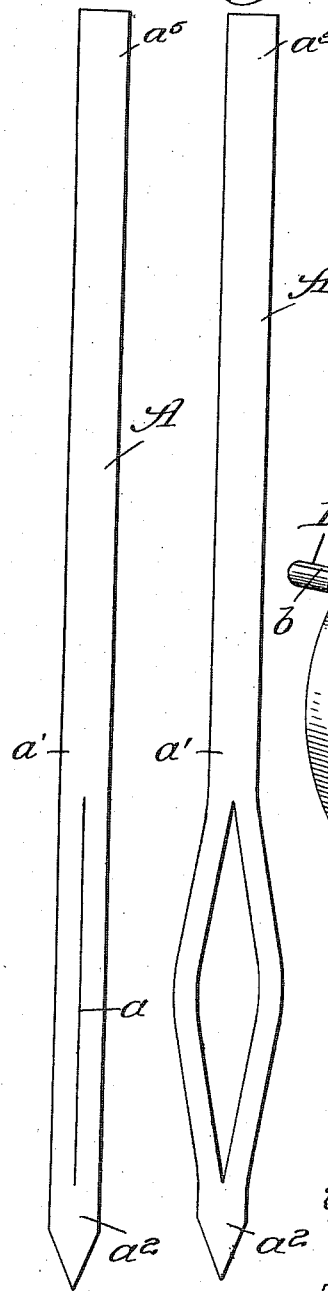
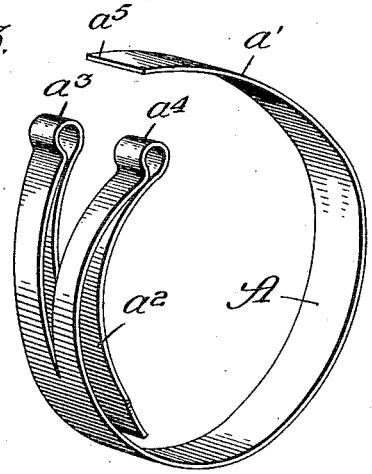
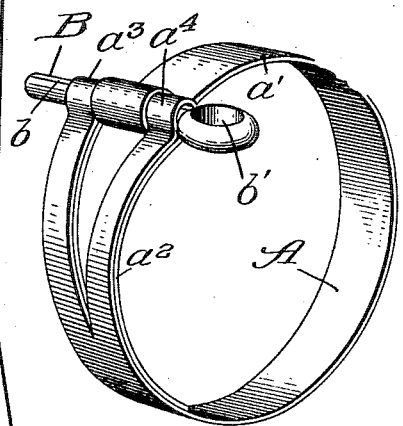
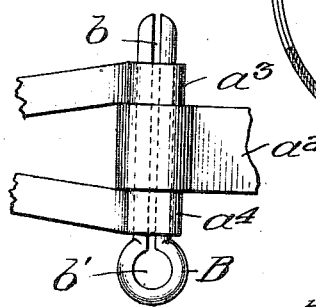
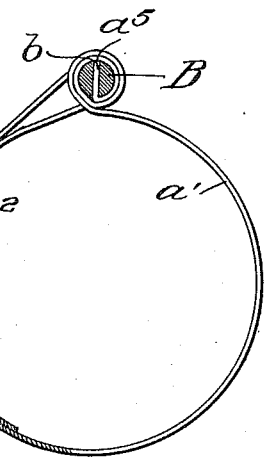

UNITED STATES PATENT OFFICE.

CHARLES G. NEIGLICK, OF CHICAGO, ILLINOIS.

HOSE-BAND.

1,305,737. Specification of Letters Patent. Patented June 3, 1919.

Application filed March 18, 1918, Serial No. 222,991. Renewed March 20, 1919. Serial No. 283,835.

*To all whom it may concern:*

Be it known that I, CHARLES G. NEIGLICK, a citizen of the United States, residing at Chicago, in the county of Cook and State of Illinois, have invented certain new and useful Improvements in Hose-Bands, of which I do declare the following to be a full, clear, and exact description, reference being had to the accompanying drawing, forming part of this specification.

My present invention has relation to hose bands adapted for the fastening of the ends of rubber hose to couplings, and the invention relates more particularly to that type of hose band formed of thin sheet metal, one end of the band being provided with a bearing for a cotter pin through which pin the opposite end of the band is passed and by the turning of which pin the tightening of the band can be effected.

The invention consists in the features of novelty hereinafter described, illustrated in the accompanying drawing and particularly pointed out in the claims at the end of this specification.

Figure 1 is a view of the blank from which my improved band will be made. Fig. 2 is a view similar to Fig. 1 but showing the slotted portion of the band expanded. Fig. 3 is a perspective view of the band after it has been folded and bent. Fig. 4 is a view showing the band with its ends joined by the cotter pin. Fig. 5 is a view in central vertical section through the band and cotter pin. Fig. 6 is an enlarged plan view showing the end portions of the band and the cotter pin passing therethrough.

My improved hose band A is formed of thin sheet metal and adjacent one end thereof is formed a longitudinal slit $a$. In the preferred form of the invention, the slit $a$ does not extend to the end of the band, the purpose of having the slit terminate inside the end of the band being to insure that the portions of the band at opposite sides of the slit shall be integrally connected at both ends of the slit.

The portions of the band $a'$ and $a^2$ opposite the slit $a$ are spread apart, as shown in the drawing, and when thus spread apart, the end portion $a^2$ of the band is reverted or folded back on the body portion of the band in such manner as to form loops $a^3$ and $a^4$ to receive and form bearings for a cotter pin B. This cotter pin B has the usual slot $b$ extending lengthwise thereof and an eye $b'$ at one end. The unslitted end $a^5$ of the band is adapted to be inserted through the slot $b$ of the cotter pin and between the bearing loops $a'$ and $a^2$ after the band has been placed around the hose. When the band has thus been placed around the hose and the end $a^5$ of the band has been passed through the slot of the cotter pin between the loops $a^3$ and $a^4$, the turning of the cotter pin (by passing a suitable instrument through the eye $b'$ thereof) will cause the wrapping of the end portion $a^5$ of the band around the cotter pin and thus cause a contraction or binding of the band about the periphery of the hose. By passing the end $a^5$ of the band through the cotter pin between the loops $a^3$ and $a^4$ formed in the spread portions of the band opposite the slit $a$, I have found that a most effective gripping of the band upon the hose is insured, because as the cotter pin is turned and strain is exerted upon the band, there is a tendency of the loops $a^3$ and $a^4$ to draw toward each other and in so doing to grip the edges of the end portion $a^5$ of the band between them, thus aiding in resisting the unwinding of the end portion $a^5$ from the cotter pin. By terminating the slit $a$ inside the adjacent end of the band and thus insuring the integral connection of the portions of the band opposite the slit at both ends of the slit $a$, several advantages result, *i. e.*, the reverted slitted portion of the band is more effectively retained against the danger of displacement which would be apt to occur if the slit $a$ extended completely through the end of the band and a more effective drawing together of the loops $a'$ and $a^2$ is insured as the band is tightened about the hose.

Since the free end $a^5$ is unslitted and is of the same width as the body of the band, the latter can be made of some length and adapted for different size hose simply by cutting off the unslitted or free end of the band to make it of proper length.

Obviously, changes may be made in the details set forth without departure from the essentials of the invention as defined in the claims.

Having thus described my invention, what I claim as new and desire to secure by Letters Patent is—

1. A hose band formed of a sheet metal strip provided with a longitudinal slit and having the portions on opposite sides of said slit spread apart and reverted to form spaced bearing loops adapted to freely encircle a cotter pin, the cotter pin rotatably mounted in said spaced bearing loops, the opposite end of said band being arranged to pass through the central portion of said cotter pin between said bearing loops and to be wound on said central portion of the cotter pin by the rotation of the latter while allowing said loops to slide longitudinally of the cotter pin and to be drawn into snug engagement with the portion of the band wound upon said pin.

2. A hose band formed from a single piece of sheet metal provided with a longitudinal slit and having the portions opposite said slit integrally connected at both ends of the slit and spread apart and reverted to form bearing loops at one end of the band to receive a cotter pin, the opposite end of said band being arranged to pass through said cotter pin between said loops.

CHARLES G. NEIGLICK.